United States Patent [19]

Batni

[11] Patent Number: 4,514,653
[45] Date of Patent: Apr. 30, 1985

[54] COMMUTATORLESS DIRECT CURRENT MACHINE

[76] Inventor: Prahlada R. Batni, 700 Butternut St., Washington, D.C. 20012

[21] Appl. No.: 593,199

[22] Filed: Mar. 27, 1984

Related U.S. Application Data

[63] Continuation-in-part of Ser. No. 370,133, Apr. 20, 1982, abandoned.

[51] Int. Cl.³ .............................................. H02K 31/00
[52] U.S. Cl. ..................................... 310/178; 310/268
[58] Field of Search ............... 310/178, 268, 112, 114, 310/168; 322/48

[56] References Cited

U.S. PATENT DOCUMENTS

| | | |
|---|---|---|
| 490,280 | 1/1893 | Hanson . |
| 1,196,713 | 8/1916 | Nelson . |
| 1,465,251 | 8/1923 | Broluska et al. ..................... 310/178 |
| 2,743,375 | 4/1956 | Parker .................. 310/268 |
| 2,914,688 | 11/1959 | Matthews ..................... 310/178 |
| 3,169,204 | 2/1965 | Moressee et al. ................... 310/211 |
| 3,187,212 | 6/1965 | Sears .................... 310/178 |
| 3,478,237 | 11/1969 | Faxon ................. 310/114 |
| 3,699,370 | 10/1972 | Caldwell ............. 310/178 |
| 3,743,874 | 7/1973 | Chabrerie et al. ................. 310/178 |
| 3,992,641 | 11/1976 | Heinrich et al. ..................... 310/268 |
| 4,082,971 | 4/1978 | Miyake et al. ....................... 310/268 |
| 4,187,441 | 2/1980 | Oney ..................... 310/112 |

OTHER PUBLICATIONS

Steinmetz; "Theory and Calculations of Electrical Apparatus", N.Y., 1917, pp. 450–455.
Dang, "Continuous Pole DC Motor", IBM Technical Disclosure Bulletin, vol. 23, No. 10, Mar. 1981, pp. 4713–4715.
Bewley, "Flux Linkages and Electromagnetic Induction", Dover, N.Y., 1964, pp. 56–59.

*Primary Examiner*—William H. Beha, Jr.
*Assistant Examiner*—D. L. Rebsch
*Attorney, Agent, or Firm*—James F. Cottone

[57] ABSTRACT

A commutatorless DC machine has axially oriented magnetic flux in the air gaps between interleaved stator and rotor disks, and the rotor disks carry one or more radially oriented armature winding elements consisting of electrical conductors serially interconnected in serpentine fashion and terminated at a pair of slip rings. The magnetic flux incident upon the two opposed planar surfaces of any one rotor disk are oppositely directed, producing electromotive forces or torques which are directly additive, resulting in heretofore unrealized electromechanical transducer action. A number of illustrative and preferred embodiments describe single or multiple rotor disk configurations, and further describe armature winding arrangements having various numbers of individual armature winding elements arranged in parallel between the slip rings. The resulting DC machines exhibit superior electrical and mechanical performance due to, among other factors, the absence of limitations imposed by commutation; they also may be designed for a wide range of electrical and mechanical requirements simply by the addition or deletion of disk sections and/or armature winding elements.

19 Claims, 16 Drawing Figures

COMMUTATORLESS DIRECT CURRENT MACHINE

BACKGROUND OF THE INVENTION

The present application is a continuation-in-part of application Ser. No. 370,133 filed on Apr. 20, 1982, now abandoned.

The present invention relates generally to commutatorless DC machines of the axial air gap type which readily function as either DC motors or DC generators. Specifically, the present invention relates to a DC machine having a plurality of disk-like stator elements and one or more interleaved disk-like rotor elements producing axial magnetic flux in the air gaps between their adjacent planar surfaces, and employing uniquely configured, radially oriented armature conductor winding elements, rotatable in the air gaps to produce the desired electromechanical transducer actions.

Both commutatorless rotary machines and axial air gap rotary machines are well known in the electrical engineering art, and have been the subject of much study and development over the years. In their most basic forms, these two features are often found in machine embodiments wherein the magnetic flux passes in the same direction from one member to the other over the whole of a single axial air gap area, and are designated as acyclic, or alternatively as homopolar machines. While the present invention goes very far beyond the basic acyclic approach and represents an entirely new family of DC machines, it is of some interest to briefly describe prior art machines exhibiting the commutatorless and axial field features.

U.S. Pat. No. 1,465,251 to Broluska et al discloses an early (1920) commutatorless DC machine having a plurality of interleaved stator and rotor disks wherein radially oriented armature conductors are immersed in axially directed magnetic fluxes to produce either motor or generator action. The design, however, employs a totally unidirectional magnetic flux (the field B is shown in FIG. 1 as directed right-to-left in ALL stator/rotor gaps) which is customary and conventional. This purely unidirectional field approach, unfortunately, calls for the segmentation of the armature conductors, which in turn gives rise to the need for a set of collector rings and rollers which engage the other circumferences of the roller disks. The technical necessity for the collector ring structure is well documented, and a rigorous presentation of the phenomenon involved may be found in the description of the "Multi-Spoke Wheel" generator on pages 57–69 of the text "Flux Linkages and Electromagnetic Induction" by L. V. Bewley. (Dover Publications, New York, 1964).

More recent prior art homopolar machines are exemplified by U.S. Pat. No. 3,743,874 to Chaberie which discloses the use of conductive liquids (liquid metals) to fill the air gaps between multiple-disk axial field machines. U.S. Pat. No. 3,669,370 to Caldwell also discloses a similar liquid metal brush approach and a single disk homopolar generator, but further teaches an overall magnetic circuit path which consists primarily of two contradirectional paths disposed over the entire machine.

Additional prior art approaches in the area of commutatorless and/or axial field machines are disclosed in U.S. Pat. Nos. 3,169,204 to Moressee et al; 4,082,971 to Miyake et al; and 4,187,441 to Oney.

Except for homopolar DC machines, a commutator of some type is an essential part of any conventional DC machine. Commutation and its associated problems may severely limit and govern the design, operation, and useful applications of a DC machine. Homopolar machines, however, though free from commutation problems, are generally not practical machines in the sense that they cannot readily replace commutator type machines in all their applications. It would indeed be fortuitous if there were a commutatorless DC machine that could replace the conventional commutator DC machine and all its applications. Such a machine would have liberal design latitudes and extensive applications, and its performance would be superior, because of the absence of commutation. Therefore, it is clear that the commutatorless DC machine taught in the present invention addresses precisely these needs, and provides a highly advantageous improvement to the art of rotating machinery.

SUMMARY OF THE INVENTION

It is therefore a primary object of the present invention to provide an improved commutatorless DC machine which may readily function as either a DC motor or a DC generator.

Another object of the present invention is to provide a DC machine which will be largely devoid of the design limitations and operational problems associated with the use of commutation devices of all types.

A further object of the present invention is to provide a DC machine which may readily be configured to operate at a wide range of voltages and currents by simply including more or less sections in the form of adding or deleting stator/rotor disks. Additionally, the number of armature winding elements disposed on a particular rotor disk may be incremented or decremented to further contribute to the wide range of operating voltages/currents which may be readily realized.

A still further object of the present invention is to provide an improved commutatorless DC motor having axially oriented magnetic flux between interleaved stator and rotor disks, where the rotor disks carry radially oriented armature conductors which are uniquely interconnected and terminated at a pair of slip rings; and wherein the magnetic flux incident upon the two planar surfaces of any one rotor disk are oppositely directed, producing net torques which are directly additive resulting in heretofore unrealized superior DC motor performance.

A yet further object of the present invention is to provide an improved commutatorless DC generator having axially oriented magnetic flux between interleaved stator and rotor disks, wherein the rotor disks carry radially oriented armature conductors which are uniquely interconnected and terminated at a pair of slip rings; and wherein the magnetic flux incident upon the two planar surfaces of any one rotor disk are oppositely directed, producing emf's which are directly additive resulting in heretofore unrealized superior DC generator performance.

By means of a number of illustrative and preferred embodiments, the present disclosure teaches the broad principles of a DC machine having axially oriented magnetic flux between interleaved stator and rotor disks, where the rotor disks carry radially oriented armature conductors which are uniquely interconnected and terminated at a pair of slip rings. The magnetic flux incident upon the two planar surfaces of any one rotor disk are opositely directed thereby producing emf's, or torques, which are additive, resulting in heretofore unrealized electromagnetic transducer action.

BRIEF DESCRIPTION OF THE DRAWINGS

Additional objects and advantages of the invention will become apparent to those skilled in the art as the description proceeds with reference to the accompanying drawings wherein.

DETAILED DESCRIPTION OF THE PREFERRED EMBODIMENTS

Figure 1:
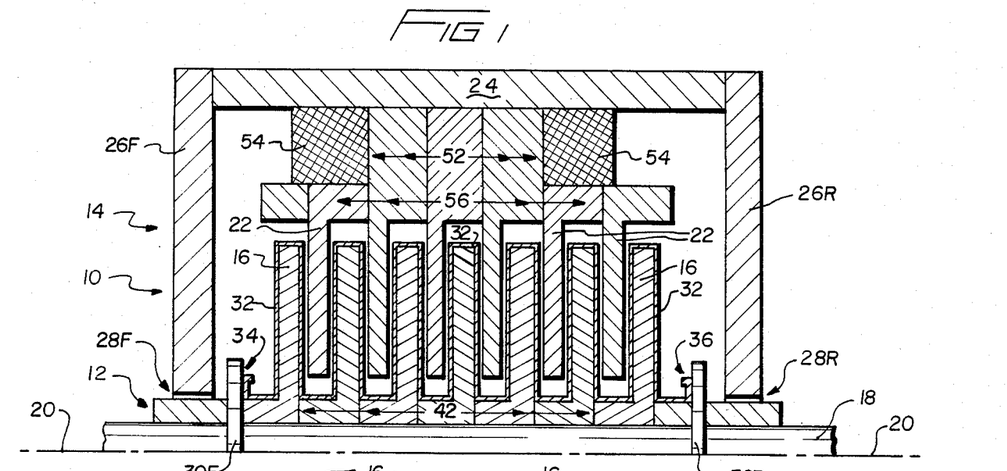
FIG. 1 is half of a vertical cross-section through an illustrative embodiment of a commutatorless DC machine according to the present invention.

Referring first to FIG. 1, there is shown half of a vertical cross-section through a multiple disk, commutatorless DC machine according to the present invention. By way of a brief introduction, an overall DC machine 10 is shown as comprising two major subassemblies including a multiple flange rotor assembly 12, rotatably mounted within a multiple mating flange stator assembly 14. The rotor assembly 12 includes a plurality of spaced apart rotor flanges 16 assembled onto a central shaft 18 which is concentric with a machine axis of rotation 20. The stator assembly 14 includes a corresponding plurality (less one) or spaced apart stator flanges 22, mounted within a hollow cylindrical yoke 24, which yoke forms part of the outer casing of the DC machine 10. A pair of circular end yokes 26F and 26R are affixed to the front and rear ends respectively of the cylindrical yoke 24 to form an enclosed compartment. The ends of the central shaft 18 pass through the end yokes 26F and 26R, via circular openings 28F and 28R, respectively. and the shaft ends are suitably retained and fitted with bearings (not shown) by well-known and conventional means. A pair of slip rings 30F and 30R are concentrically affixed on alternate ends of the central shaft 18 and serve as the electrical input/output terminals for a plurality of armature elements distributed over the rotor flanges. A typical armature winding element 32 is shown in cross-section as being terminated at its forward end to the slip ring 30F via a contact 34, and at its rearward end to the slip ring 30R via a contact 36. The armature winding element 32 is configured as a discreet electrical wire-like conductor, shaped to follow the outer contours of the plurality of rotor flanges, and appears in cross-section as a continuous and fairly regular serpentine path confined to a particular radial plane that includes the axis.

The structure and functions of each of the above elements, as well as additional elements, are described in more detail hereinbelow. It is worthy of note that the elements outlined above are applicable to operation of the DC machine 10 as either a commutatorless direct DC motor or as a commutatorless direct DC generator. The term "direct DC" denotes that as a DC motor or DC generator, the input-output voltages are produced as a continuous unidirectional input-output, and do not require commutator action for rectification into DC.

Figure 2:
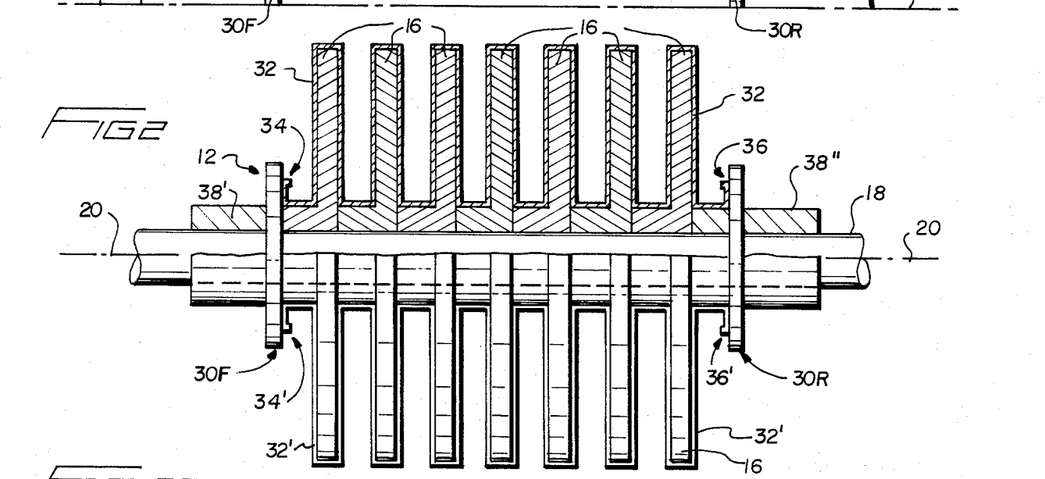
FIG. 2 is a detailed vertical cross-section of the rotor assembly shown in FIG. 1.
Figure 3A:
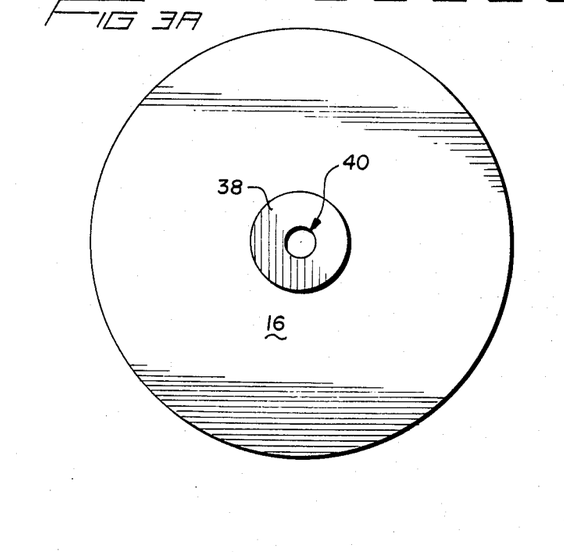
FIGS. 3A and 3B show side and end views, respectively, of a typical rotor flange.
Figure 3B:
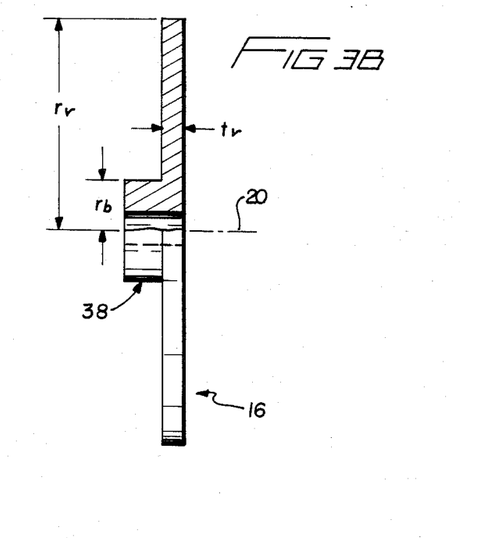

Referring now to FIG. 2, there is shown a detailed vertical cross-section of the rotor assembly 12 of FIG. 1. In the illustrative embodiment of FIG. 1, a seven-section DC machine is shown, the seven-section rotor assembly depicted corresponds to that embodiment. The rotor assembly 12 is pictured as comprising a plurality of rotor flanges 16 longitudinally stacked along the central shaft 18. Reference to FIGS. 3A and 3B show each of the flanges 16 to be generally disk shaped, and to have a thickness in the axial (or longitudinal) direction at its outer periphery of "$t_r$". The flanges 16 further have a rim boss 38 at their inner periphery, and a centrally located opening 40 to admit the central shaft 18. The rim boss 38 has an axial extent slightly larger than the thickness "$t_r$" of the flange, and a radial dimension "$r_b$" very much less than the radial dimension "$r_r$" of the flange. The flanges 16 are made of material having predetermined desired magnetic properties and may illustratively be of forged or cast steel. When assembled as a seven-section embodiment as shown, the seven individual flanges 16 (plus front and rear end pieces 38' and 38") create an armature core region 42 by virture of the increased mass of magnetic material provided by the thickened rim bosses being longitudinally stacked. The armature core region 42 (indicated generally by the multiheaded arrow symbol) so formed functions similarly to the armature core of a conventional DC machine. The central shaft 18 may be made of steel suitable for supporting the various rotor components during their high speed rotation operation, and the entire assembly may be fastened together by conventional means.

A wide variety of complete armature winding arrangements may be used in conjunction with the rotor assembly of FIG. 2 depending on the basic use to which the machine is being put (i.e., motor or generator); and further depending on the particular electrical and mechanical characteristics (i.e., electrical power/torque/speed) which it is desired that the machine is to exhibit. In the preferred embodiment of FIG. 2, two armature winding elements are shown. These are windings 32 and 32', both of which are identical and contain a total of seven contoured portions, corresponding to the number of rotor flanges of the embodiment. Only the winding 32 will be described, it being understood that the winding 32' plus other windings equally spaced circumferentially around the rotor flanges (not shown) will be identical. Basically, the winding 32 is a continuous electrical conductor, such as a length of copper wire, formed into a serpentine contour to fit along the surfaces of each of the stack of rotor flanges in a rotor assembly. For purposes of clarity, the windings 32 and 32' are shown as affixed on the outer surfaces of the flanges. Windings 32 and 32' are confined to a single plane containing the axis of rotation 20, around which axis the plane (and the two windings) rotate. The plane containing the winding 32 is bounded at its radially inwards extremity (lower edge as shown) by a line parallel to the axis 20, and the plane coontaining the winding 32' is bounded at its radially inwards extremity (upper edge as shown) by a line parallel to the axis 20. In an alternate preferred embodiment, the windings may be affixed into shallow slots (not shown) formed into the flat side surfaces of the rotor flanges. Each extremity of the winding 32 is connected to its adjacent slip ring for electrical contact. The slip ring 30F is mounted around the magnetic end piece 38' and insulated from it (concentrically with the rotational axis 20), and connects with the winding 32 at the contact point 34. Slip ring 30R is similarly insulatingly mounted around the end piece 38" and connects with the winding 32 at the contact point 36.

Figures 7, 8:
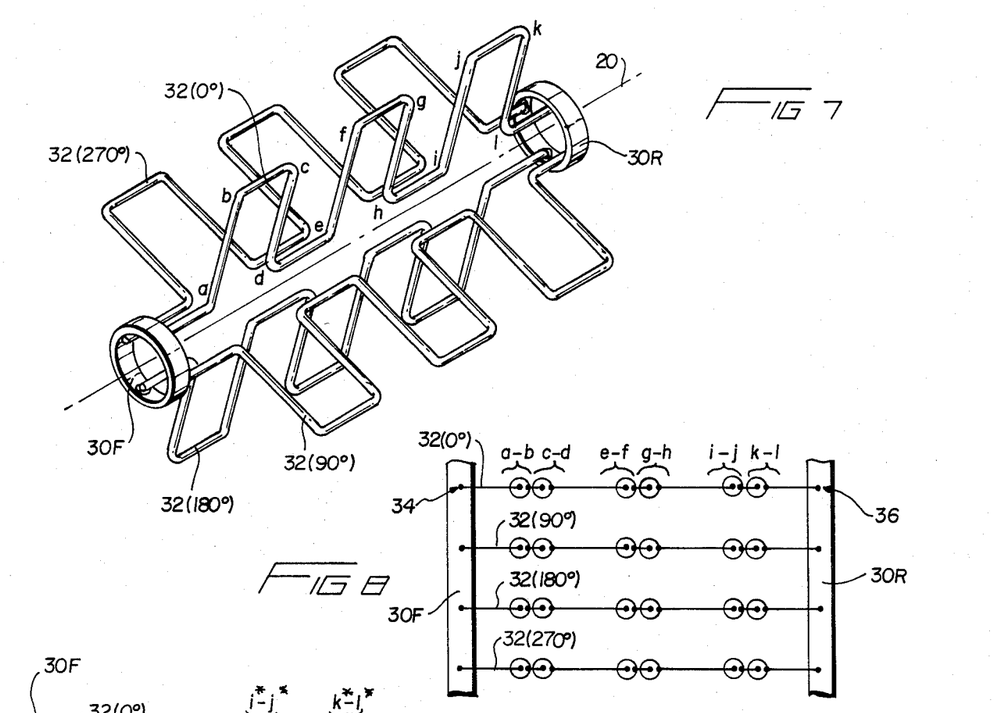
FIG. 7 is a highly schematic perspective drawing of a complete armature winding arrangement for a four-winding-element, three-section DC machine according to the present invention.
FIG. 8 is a simplified electrical equivalent circuit corresponding to the complete armature winding arrangement of FIG. 7 when used as a DC generator.

A clearer description of complete armature winding arrangements contemplated may be had with reference to the perspective drawing of FIG. 7, along with its corresponding simplified electrical equivalent circuit of FIG. 8, in addition to the aforementioned FIGS. 2, 3A and 3B. FIG. 7 shows a complete armature winding arrangement for a DC machine comprising, illustratively, a three-section rotor assembly (i.e., three rotor flanges); and also comprising, illustratively, four armature winding elements of the type 32 circumferentially spaced at 90° intervals around the rotor flanges. The winding element designated 32(0°) corresponds nominally to the winding element designated 32 in FIG. 2; while the winding element designated 32(180°) corresponds nominally to the winding element designated 32' in FIG. 2. The winding elements 32(90°) and 32(270°) which are not shown in FIG. 2, along with the 32(0°) and 32(180°) winding elements are all connected in electrical parallel via the termination of their corresponding extremities on slip rings 30F and 30R. The number of rotor sections is shown in FIG. 7 as being three, as compared to the seven-section embodiment of FIG. 2, largely to provide an uncluttered illustration. In actual commutatorless DC machines designed according to the principles taught herein, it is contemplated that the number of rotor sections could be as few as one, or several dozen or more.

In the electrical equivalent circuit of FIG. 8, which is shown for the case where the DC machine is being operated as a DC generator, it is seen that the winding element designated 32(0°) comprises six independent emf generators, each of which corresponds to a radial portion of an armature winding. Thus, the winding portion a-b-c-d corresponding to the first one of the three sections of winding 32(0°) of FIG. 7 is electrically equivalent to the two emf generators designated a-b and c-d of the first one of the three sections of winding 32(0°) of FIG. 8. In like manner, the two other sections of winding 32(0°), namely e-f-g-h and i-j-k-l of FIG. 7 translate into the four emf generators e-f and g-h, plus i-j and k-l of FIG. 8. The remaining windings 32(90°), 32(180°), and 32(270°), of both FIG. 7 and FIG. 8 are similarly related. In short, a complete armature winding arrangement consists of a number of armature winding elements, each spanning from one slip ring to the other; all of the armature winding elements being in parallel between the slip rings. Conventional sets of brushes (not shown) contact the slip rings, and leads from the brushes are brought out to the machine terminal board for suitable external interconnections. A further alternate embodiment of the present invention is shown by way of the simplified electrical equivalent circuit of FIG. 9. This embodiment depicts the DC machine 10 while is is being operated as a commutatorless DC motor. By reference to a plurality of torque generating elements depicting as a pair of adjacent circles "-∞-" (in positions analogous to the emf generators of FIG. 8) there is shown a seven-section DC machine. The complete armature winding arrangement comprises eight separate winding elements, each generally of the type 32, spaced 45 degrees apart. These eight windings are designated 32(0°), 32(45°), . . . 32(315°). Each armature winding element has a total of fourteen torque generators (seven pairs) with the third pair in the 32(0°) winding designated as consisting of an i*-j* part and a k*-l* part. As before, the individual torque generating elements are associated only with the radial portions of the armature winding conductors. A fuller description of the modes of operation of the commutatorless DC machine 10 as both a motor and also as a generator is provided below.

Figure 4:
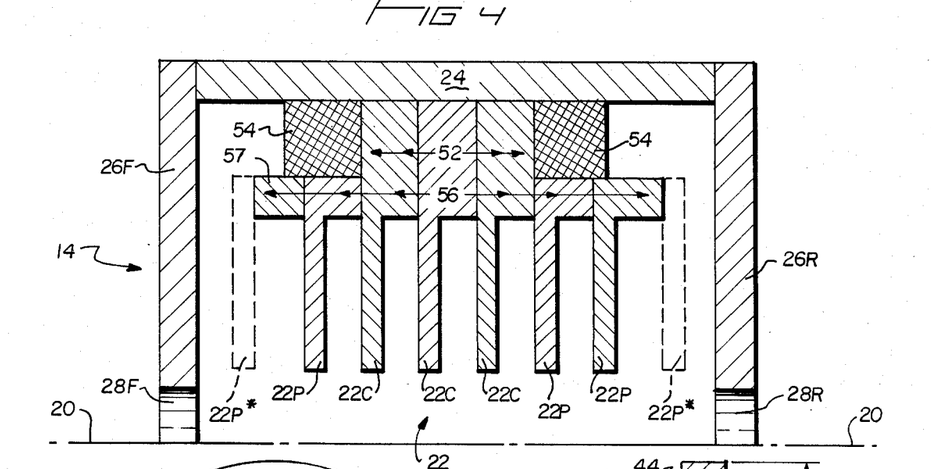
FIG. 4 is a detailed vertical cross-section of the stator assembly shown in FIG. 1.
Figure 5A:
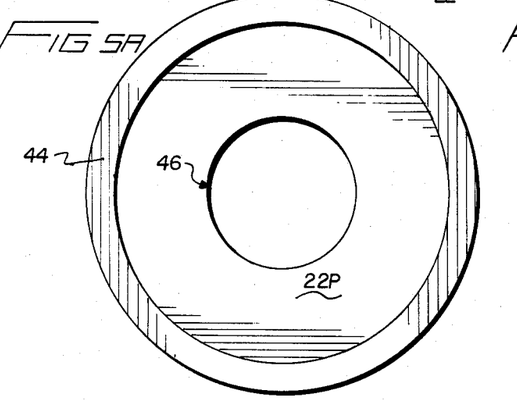
FIGS. 5A and 5B show side and end views, respectively, of an illustrative plain type stator flange.
Figure 5B:
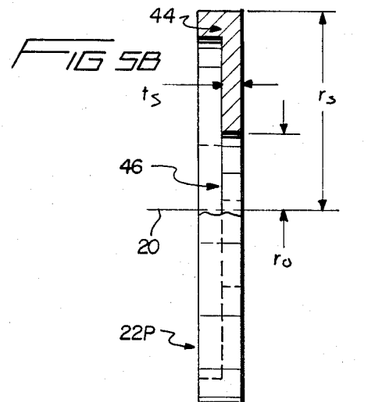

Referring now to FIG. 4, there is shown a detailed vertical cross-section of the stator assembly 14 of FIG. 1. The assembly 14 is pictured as comprising a plurality of stator flanges 22 assembled within the cylindrical, longitudinal yoke 24, all of which is capped by a pair of end yokes 26F and 26R. Longitudinal bolts (not shown) may be used to align and fasten the various components together in any conventional manner. By reference to FIGS. 5A, 5B, 6A, and 6B, in addition to FIG. 4, the stator flanges 22 are shown to be of two distinct types. These types are designated a stator core flange 22C, and a stator plain flange 22P. The plain type flange 22P of FIGS. 5A and 5B is shown as generally disc-shaped, and having a thickness at its inner periphery of "$t_s$". The plain flanges 22P further have a rim boss 44 at the outer periphery on one side, and a centrally located bore of radius "$r_o$". The rim boss 44 has an axially extent approximately the same as the thickness "$t_s$", and a radial extent very much less than the dimension "$r_s$" of the flange 22P. Momentary reference to the overall DC machine of FIG. 1 shows that the central bore 46 has radius "$r_o$"0 slightly larger than the radial dimension "$r_b$" of the boss 38 shown in FIG. 3B, allowing the rotor assembly 12 to rotate smoothly within the stator assembly 14.

Figures 6A, 6B:
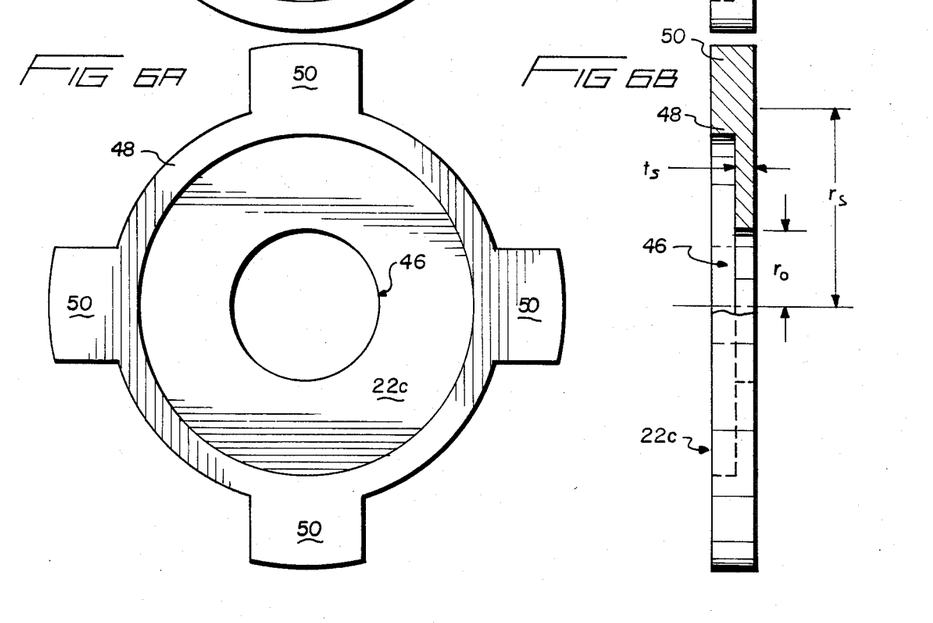
FIGS. 6A and 6B show side and end views, respectively, of a typical core type stator flange.

The core type flange 22C of FIGS. 6A and 6B is shown as also being generally disc-shaped, and having a thickness at its inner periphery of "$t_s$". The core flange 22C also has a rim boss 48 at its outer periphery on one side, and further has four radial pole core projections 50 spaced at 90 degree intervals around its circumference. The rim boss 48 extends over the pole core projections 50. Except for the presence of the core projections 50, the overally configurations and dimensions of the core flange 22C are the same as those of the plain flange 22P. On close assembly, these pole core projections 50 form a pole core region 52 (its extent indicated generally by the associated multiple headed arrows) around which a field core winding 54 is wound. Of the four projections shown in FIG. 6A, only one pole core region 52 is shown in FIG. 2. It is to be understood that the four pole core configuration shown is illustrative only, and that the actual number of poles to be used in any particular DC machine is largely established as a matter of design choice. Thus, DC machines according to the present invention may contain more or less pole core projections, and may also be of odd or even numbers.

A cylindrical stator core region 56 (its extent indicated generally by the associated multiple headed arrows) is formed by the close assembly of the plain type and core type stator flanges. As with the pole core region 52, this stator core region 56 is not a separate component as such, but is defined largely in terms of its function. The function of the stator core region 56 is similar to that of pole shoes in a conventional DC machine. Additional pieces of magnetic structure such as an end piece 57 may be included as necessary to suitably shape the magnetic circuit paths. Further, in selected preferred embodiments of the stator assembly 14, supplementary plain flanges 22P* (indicated in dotted lines as slightly modified, i.e., not having significant rim bosses 44) may be included at the forward and rearward ends of the stator assembly to produce a stator flange/rotor flange interleaving arrangement wherein all rotor flanges 16 are surrounded on both of their planar surfaces by stator flanges of the types 22C and/or 22P and/or 22P*.

Figures 9, 10:
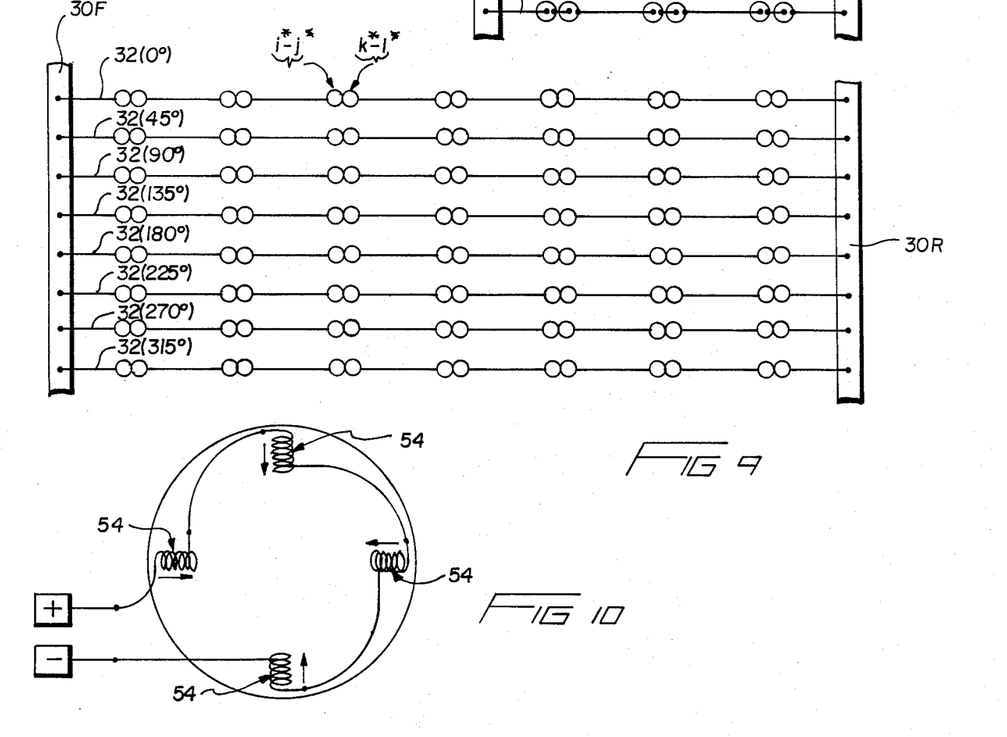
FIG. 9 is a simplified electrical equivalent circuit of a complete armature winding arrangement for an eight-winding-element, seven-section DC machine when used as a DC motor.
FIG. 10 is a simplified electrical equivalent circuit of a typical four winding stator field arrangement.

In the embodiment of FIG. 4, separate field coils would be mounted on each of the four pole core regions (only one shown) and the ends of each of these coils are brought out to the DC machine terminal board (not shown) for mutual and external electrical connections. A simplified electrical schematic of the stator field windings is shown in FIG. 10 as four identical sets of field windings 54 connected in series and brought out to a pair of terminals "+" and "−". The particular arrangement of field windings is largely determined by the design requirements a given machine is in response to. The number of individual coils (such as the single field core winding 54) on each pole core and their specific winding and interconnection pattern is dependent on the type of DC machine contemplated. Illustrative machine types include separately excited, shunt excited, series excited and compound excited. Also, field control rheostats external to the DC machine (not shown) may be employed as part of the excitation source applied to the "+/−" terminals. While the arrangement of field windings is a matter of design choice, it is significant to observe in the embodiment of FIG. 10 that the resulting magnetomotive force (hereinafter mmf), as depicted by the arrow symbols "→", are unidirectional. In this case, all four "→" are directed radially inwards to produce the desired magnetic circuit paths, as is detailed below.

Figure 11:
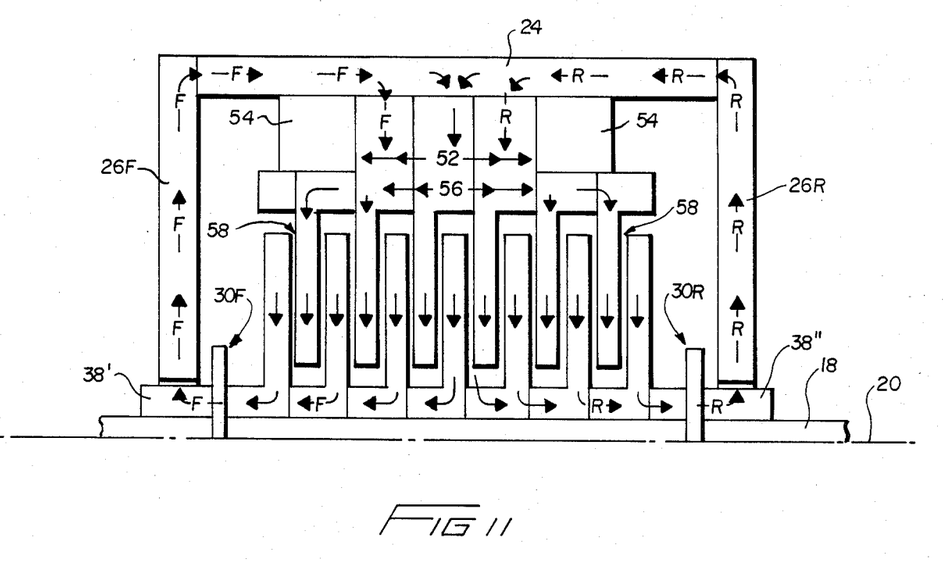
FIG. 11 shows typical magnetic circuits and flux paths of the preferred embodiment of FIG. 1, in highly schematic form.

Based on the structures detailed above, a description of the operating principles of the DC machine both as a DC motor and as a DC generator is now facilitated. While the rotor and stator electrical circuits are comparatively straightforward, the magnetic circuits of the present invention contrast significantly with the magnetic circuits of the conventional DC machine, and warrant special attention. Referring now to FIG. 11, there is shown a typical magnetic circuit and the resulting flux paths of the preferred embodiment of a DC machine that was shown in FIG. 1. To provide improved emphasis on the magnetic circuit paths of interest, a number of symbols have been omitted from this drawing, but it is to be understood that FIG. 11 represents the same seven-section DC machine described in connection with FIGS. 1, 2 and 4.

In operation, all of the field coils of the DC machine are excited from a suitable DC source such that the mmf produced by the field coils can be made to be directed either radially inwards or radially outwards depending on the direction of the currents in the coils. The direction chosen does not matter to establish the operating principles. In the present description, all of the field coil excitations are chosen so as to produce mmf's directed radially inwards such that all of the pole cores have radially inward directed magnetic fluxes. This flux gets distributed as shown in the stator core to all the stator flanges, and takes the two major paths indicated by the two sets of arrows —F→ and ←R— to axially cross the air gaps 58 between contiguous stator and rotor flange surfaces over their overlapping portions. Thereafter as shown by the arrows, the flux paths enter the rotor flanges; reaches the armature core; and travels axially towards the front (or rear) of the machine towards the end yokes. The flux paths then cross the very thin air gaps between 38' and 38" to reach respectively, the end yokes 26F and 26R; the flux travels radially outwards in the two end yokes; then turns to travel axially inward towars the pole in the longitudinal yoke 24; and finally returns to the pole core regions 52, thereby completing the magnetic circuit. Because of the symmetry of parts, there are two symmetrical magnetic circuit paths beyond the pole cores. The forwardly extending path (towards 26F) making a clockwise pattern indicated generally by its arrows —F→; and the rearwardly entending path (towards 26R) making a counter clockwise pattern indicated generally by its arrows ←R→.

The flux in the air spaces 58 sandwiched by the rotor and stator flanges (hereinafter called the air gap or air gap flux) has the following features of importance. Firstly, the air gap fluxes are substantially all axially directed. Secondly, the air gap fluxes leave the stator flange surfaces substantially normal to the surfaces, and both the forwardly and rearwardly facing surfaces of all stator flanges act as if they are flux emitter surfaces. Thirdly, the air gap fluxes enter the rotor flange surfaces substantially normal to those surfaces, and both the forwardly and rearwardly facing surfaces of all the rotor flanges (except for the end flanges) act as if they are flux collector surfaces. As will be described below, the magnetic flux incident upon the two planar surfaces of any one rotor flange are oppositely directed—i.e., both fluxes are interiorly directed.

Figure 12:
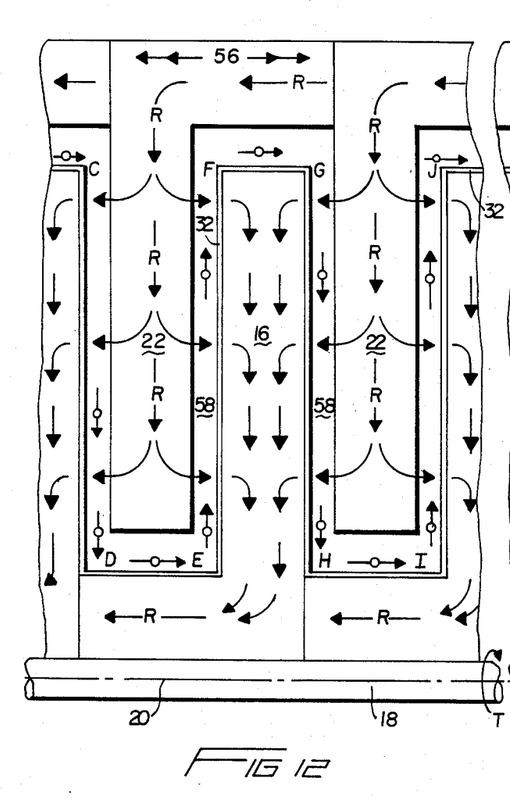
FIGS. 12 and 13 show enlarged portions (from FIG. 11) of typical magnetic circuits and flux paths in Fleming's Rules interaction regions for, respectively, operation as DC motors, and as DC generators.
Figure 13:
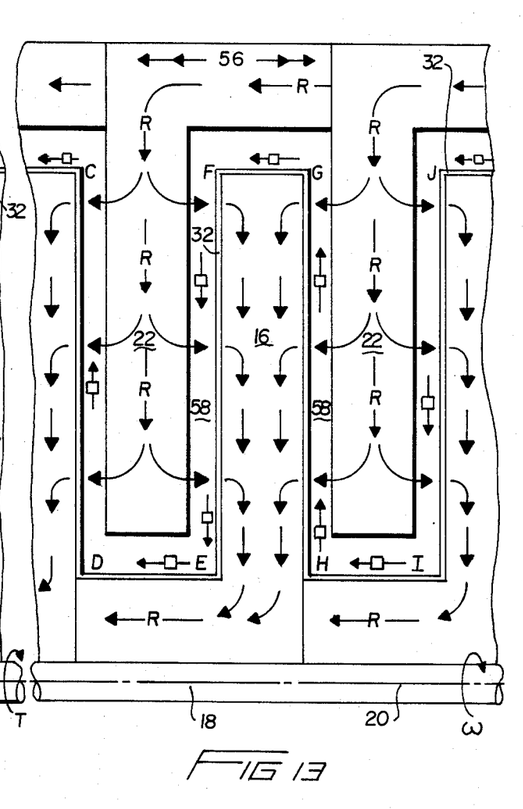

More detailed description of the magnetic circuits and flux paths is facilitated by reference to FIGS. 12 and 13 which show enlarged portions of typical rotor/stator interaction areas extracted from FIG. 11. In both FIGS. 12 and 13, the path DEFGHI shows a typical portion of the armature winding element. (These capital-lettered conductor paths are generally the same as those indicated in lower-case letters in FIG. 7). As seen, lengths EF and GH have radial runs, while lengths DE, FG, AND HI have axial runs. It is significant to note that the interaction (i.e., linkages) of the magnetic flux with the axial run portions (DE, FG, AND HI) is absent, because the magnetic flux and these conductor lengths are parallel, and/or lie in fringe magnetic field regions. Over the radial run portions (i.e., EF and GH), the length of the conductor lying in the magnetic field air gap 58 has full interaction (linkages) with the air gap magnetic flux, because the two are normal to each other. The above flux/conductor orientations are typical, and extend over the full run of each armature winding element. The same relationships obtain for all other winding elements in a complete armature winding arrangement.

Considering now operation of the DC machine 10 as a commutatorless DC motor, let all the field coils be excited to establish a magnetic field as shown in FIG. 12. Note that the flux path designated ←—R—divides further into two paths in the stator flanges to enter each rotor flange from opposite directions. Thus, the rotor flange within the conductors EF and GH experiences front-to-rear directed flux from the stator flange emitter surface closest to the EF surface; and that the same rotor flange experiences rear-to-front directed flux from the stator flange emitter surface closest to the GH surface. Let the forward slip ring 30F of the machine be connected to a suitable external DC source (through a starting rheostat, not shown) positive terminal, and the rearward slip ring 30R be connected to the negative terminal. The direction of the resulting armature current is shown by motor current arrows —O→. The interaction of the air gap magnetic flux with the orthogonally oriented current carrrying conductor portions causes mechanical forces on the conductor. Applying Fleming's Left-Hand Rule (the motor rule) and looking at the machine from the rearward end of the shaft, the mechanical forces on the conductors EF and GH are both in the clockwise direction. These forces constitute a clockwise torque T on the rotor assembly 12. This condition extends over the particular armature winding element 32, and further over the complete armature windings arrangements, for the portions of the conductors similarly disposed. All of these forces being additive, a large resultant torque is created on the rotor assembly, thereby producing the desired operation as a DC motor. In operation, the commutatorless DC motor of the present invention exhibits the usual rotary device properties such as counter emf, losees, and the like.

Considering operation of the DC machine 10 as a commutatorless DC generator, let all the field coils again be excited to establish a magnetic field as shown in FIG. 13 (identical to that of FIG. 12). Let the rotary shaft 18 be coupled to a prime mover to cause clockwise rotation ω looking from the rearward end of the DC machine. Consider the interaction of the air gap flux as before with the now rotating active armature conductor portions EF and GH. Applying Fleming's Right-Hand Rule (the generator rule) the conductors experience dynamically induced emfs, the directions of which are from H to G and from F to E as shown by the induced current arrows —□→ in FIG. 13. These emfs are directly additive in the winding element. This condition extends over the particular armature winding element 32 and for the completer armature winding element arrangements, for the conductors similarily disposed. All other portions of armature conductors disposed substantially differently from EF to GH do not produce any induced emfs. Thus the DC machine 10 operates as a DC generator and produces the resultant emf between the two slip rings, the forward slip ring attaining positive polarity, and the rearward slip ring attaining negative polarity. The DC machine functioning either as a motor or as a generator can be loaded as in conventional DC machines, and controls similar to those used in conventional DC machines may be incorporated into it. Further, the DC machine can be built for different types of excitation to obtain different characteristics as in conventional DC machines.

In summary, it is noted that commutatorless DC machines acting either as motors or as generators may be realized using the teachings of the present invention, which simultaneously exhibit the following desirable properties. Commutators of all types are specifically absent, thereby completely eliminating the full range of electrical problems they present, and further eliminating the design limitations the conventionally impose on rotating machines. Direct current exists in all of the armature winding conductors, and slip rings are used only as electrical inputs or outputs from the machine. The stacking of any number of separate disk (both rotor and stator) sections along with the straightforward armature winding arrangements, permits the realization of commutatorless DC machines for operation literally at almost any voltage or current desired.

Although the invention has been described in terms of selective preferred embodiments and alternate embodiments thereof, the invention should not be deemed limited thereto, since other embodiments and modifications will readily occur to one skilled in the art. For example, while the embodiments described show the rotor structure as rotating within stationary stator structure, as is conventional; it would be merely a design choice to embody the disclosed inventive concepts into a machine wherein the stator structure were rotated around stationary rotor structure. It is therefore to be understood that the appended claims are intended to cover all such modifications as fall within the true spirit and scope of the invention.

What is claimed is:

1. A commutatorless DC machine having an outer housing and a shaft for rotation therein, comprising:
    (a) a plurality of axially spaced annular stator disks of magnetic material mounted within said housing;
    (b) at least one axially spaced annular rotor disk of magnetic material arranged concentrically along said shaft for rotation therewith;
    (c) each of said at least one rotor disk positioned adjacent to at least one stator disk and interleaved therewith to establish axial air gaps between the adjacent surfaces of said interleaved disks;
    (d) a plurality of radially disposed electrical conductors affixed to each of said at least one rotor disk so as to be rotatable in said air gaps, and serially interconnected via a serpentine path into a unitary armature winding element having two ends wherein said unitary armature winding element is confined to a portion of a radial plane containing the axis of rotation of the shaft and bounded on one edge by said axis;
    (e) each of said ends connected to one of a pair of slip rings mounted on said shaft; and
    (f) whereby two of the group consisting of said unitary armature winding element, and said axial air gaps, and said rotatable shaft, may be so energized as to produce electromechanical transducer action.

2. The commutatorless DC machine of claim 1 having a composite armature winding arrangement comprising a plurality of said unitary winding elements in circumferentially spaced apart planes, all of said unitary armature winding elements electrically connected in parallel between said slip rings.

3. The commutatorless DC machine of claim 1 having a plurality of annular rotor disks, each interleavedly positioned between a pair of stator disks and spaced therefrom to establish axial magnetic air gaps between the adjacent surfaces of said interleaved disks.

4. The commutatorless DC machine of claim 1 further comprising at least one field winding for producing a unidirectional magnetic flux in said stator disks thereby establishing a magnetic circuit path which is substantially axially directed in said axial air gaps and configured such that magnetic fluxes incident upon the two opposed planar surfaces of any one rotor disk are oppositely directed.

5. The commutatorless DC machine of claim 4 having a plurality of said flux producing field windings energized from a direct current source and configured to establish each of the planar surfaces of said stator disks as unidirectional flux emitters of substantially uniform strength, said flux being directed outwardly from and directed substantially normal to said planar surfaces, whereby the planar surfaces of said interleavedly positioned rotor disks are established as flux collectors.

6. The commutatorless DC machine of claim 5 wherein said plurality of flux producing windings are further configured to establish overall magnetic circuit paths which include said machine outer housing as part of said paths.

7. The commutatorless DC machine of claim 6 wherein said overall magnetic circuit flux paths comprise two primary contradirectional paths including a first path having magnetic flux oriented in a first axial direction within a first portion of said housing and a second path having magnetic flux oriented in a second axial direction within a second portion of said housing.

8. The commutatorless DC machine of claim 7 wherein said machine comprises two approximately equal longitudinal portions divided by a radial plane and designated as forward and rearward portions, such that a first path is largely confined to said forward portion and carries a magnetic circuit flux path closed in a first circular direction, and a second path is largely confined to said rearward portion and carries a magnetic flux path closed in a second circular direction opposite to said first circular direction.

9. A commutatorless DC motor having an outer housing and an axial shaft journalled for rotation therein, comprising:
(a) a plurality of axially spaced annular stator disks of magnetic material fixedly mounted within said housing;
(b) at least one axially spaced annular rotor disk of magnetic material concentrically arranged and fixedly mounted on said shaft for rotation therewith;
(c) each of said at least one rotor disk positioned adjacent to at least one stator disk and interleaved therewith to establish axial air gaps between the adjacent surfaces of said interleaved disks;
(d) a plurality of radially disposed electrical conductors affixed to each of said at least one rotor disk so as to be rotatable in said air gaps, and serially interconnected via a serpentine path into a unitary armature winding element having two ends wherein said unitary armature winding element is confined to a portion of a radial plane containing the axis of rotation of the shaft and bounded on one edge by said axis;
(e) each of said ends connected to one of a pair of slip rings concentrically mounted on said shaft for rotation therewith;
(f) at least one field winding for producing a unidirectional magnetic flux in said stator disks thereby establishing a magnetic circuit path which is substantially axially directed in said axial air gaps and configured to direct magnetic fluxes upon the two opposed planar surfaces of any one rotor disk which are oppositely directed; and
(g) whereby upon applying an external source of direct current to said unitary armature winding element to establish radially directed current flow and further applying said direct current source to said at least one field winding to establish axially directed magnetic flux in said air gaps, a net force is produced on said shaft so as to provide electromechanical conversion.

10. The commutatorless DC motor of claim 9 having a composite armature winding arrangement comprising a plurality of unitary winding elements in circumferentially spaced apart planes all of said unitary winding elements electrically connected in parallel between said slip rings.

11. The commutatorless DC motor of claim 4 having a plurality of annular rotor disks, each interleavedly positioned between a pair of stator disks and spaced therefrom to establish axial magnetic air gaps between the adjacent surfaces of said interleaved disks.

12. The commutatorless DC motor of claim 4 further comprising at least one field winding for producing a unidirectional magnetic flux in said stator disks thereby establishing a magnetic circuit path which is substantially axially directed in said axial air gaps, and further having a plurality of said flux producing field windings energized from said direct current source and configured to establish each of the planar surfaces of said stator disks as unidirectional flux emitters of substantially uniform strength, said flux being directed outwardly from and directed substantially normal to said planar surfaces, whereby the planar surfaces of said interleavedly positioned rotor disks are established as flux collectors.

13. The commutatorless DC motor of claim 7 wherein said plurality of flux producing windings are further configured to establish overall magnetic circuit flux paths which include said machine outer housing as part of said paths.

14. A commutatorless DC generator having an outer housing and an axial shaft journalled for rotation therein, comprising:
(a) a plurality of axially spaced annular stator disks of magnetic material fixedly mounted within said housing;
(b) at least one axially spaced annular rotor disk of magnetic material concentrically arranged and fixedly mounted on said shaft for rotation therewith;
(c) each of said at least one rotor disk positioned adjacent to at least one stator disk and interleaved therewith to establish axial air gaps between the adjacent surfaces of said interleaved disks;
(d) a plurality of radially disposed electrical conductors affixed to each of said at least one rotor disk so as to be rotable in said air gaps, and serially interconnected via a serpentine path into a unitary armature winding element having two ends wherein said unitary armature winding element is confined to a portion of a radial plane containing the axis of rotation of the shaft and bounded on one edge by said axis;

(e) each of said ends connected to one of a pair of slip rings concentrically mounted on said shaft for rotation therewith;

(f) at least one field winding for producing a unidirectional magnetic flux in said stator disks to establish a magnetic circuit path which is substantially axially directed in said axial air gaps and further configured to establish oppositely directed magnetic fluxes upon the two opposed planar surfaces of any one rotor disk; and (g) whereby upon applying an external source of direct current to said at least one field windings to establish axially directed magnetic flux in said air gaps, and further applying an external source of rotation to said shaft, a net direct current is produced in said armature winding so as to provide mechanical to electrical energy conversion.

15. The commutatorless DC generator of claim 14 having a composite armature winding arrangement comprising a plurality of unitary winding elements in spaced apart circumferential planes all of said unitary winding elements electrically connected in parallel between said slip rings.

16. The commutatorless DC generator of claim 9 having a plurality of annular rotor disks, each positioned between a pair of stator disks and spaced therefrom to establish axial magnetic air gaps between the adjacent surfaces of said interleaved disks.

17. The commutatorless DC generator of claim 11 wherein said plurality of rotor disks exceeds by one said plurality of stator disks.

18. The commutatorless DC generator of claim 9 further comprising at least one field winding for producing a unidirectional magnetic flux in said stator disks thereby establishing a magnetic circuit path which is substantially axially directed in said axial air gaps, and further having a plurality of said flux producing field windings energized from said direct current source and configured to establish each of the planar surfaces of said stator disks as unidirectional flux emitters of substantially uniform strength, said flux being directed outwardly from and directed substantially normal to said planar surfaces, whereby the planar surfaces of said interleavedly positioned rotor disks are established as flux collectors.

19. The commutatorless DC generator of claim 13 wherein said plurality of flux producing windings are further configured to establish overall magnetic circuit paths which include said machine outer housing, as part of said paths.

* * * * *